US011024055B2

(12) United States Patent
Hsu et al.

(10) Patent No.: US 11,024,055 B2
(45) Date of Patent: Jun. 1, 2021

(54) VEHICLE, VEHICLE POSITIONING SYSTEM, AND VEHICLE POSITIONING METHOD

(71) Applicant: INDUSTRIAL TECHNOLOGY RESEARCH INSTITUTE, Hsinchu (TW)

(72) Inventors: Bo-Chun Hsu, Hsinchu (TW); Wei-Po Nien, Hsinchu (TW); Yi-Ling Wu, Hsinchu (TW); Hsiu-Yu Lin, Hsinchu (TW); Shi-Xin Chen, Hsinchu (TW); An-Kai Jeng, Hsinchu (TW); Chung-Hsien Yang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/508,471

(22) Filed: Jul. 11, 2019

(65) Prior Publication Data
US 2020/0175720 A1 Jun. 4, 2020

Related U.S. Application Data

(60) Provisional application No. 62/773,124, filed on Nov. 29, 2018.

(30) Foreign Application Priority Data

Apr. 11, 2019 (TW) .................................. 108112604

(51) Int. Cl.
*G01S 17/931* (2020.01)
*G06T 7/73* (2017.01)
(Continued)

(52) U.S. Cl.
CPC ................ *G06T 7/75* (2017.01); *G01S 17/42* (2013.01); *G01S 17/89* (2013.01); *G01S 17/931* (2020.01);
(Continued)

(58) Field of Classification Search
CPC ............ G06T 7/75; G06T 2207/10028; G06T 2207/30252; H04N 13/156; H04N 13/293; G01S 17/931; G01S 17/42; G01S 17/89
See application file for complete search history.

(56) References Cited

U.S. PATENT DOCUMENTS 9,274,526 B2   3/2016  Murai et al.
10,061,027 B2  8/2018  Goldberg et al.
(Continued)

FOREIGN PATENT DOCUMENTS

CN   105676643   6/2016
CN   106407947   2/2017
(Continued)

OTHER PUBLICATIONS

Hu, et al. "Registration of image and 3D LIDAR data from extrinsic calibration", 2015 International Conference on Transportation Information and Safety(ICTIS); Mar. 9, 2015; 102-106.
(Continued)

*Primary Examiner* — John R Schnurr
(74) *Attorney, Agent, or Firm* — Amin, Turocy & Watson, LLP

(57) ABSTRACT

A vehicle, a vehicle positioning system and a vehicle positioning method are provided. The vehicle positioning system includes a 2D image sensor, a 3D sensor and a processor. The 2D image sensor is configured for obtaining 2D image data. The 3D sensor is configured for obtaining 3D point cloud data. The processor is coupled to the 2D image sensor
(Continued)

and the 3D sensor, and configured for merging the 2D image data and the 3D point cloud data to generate 3D image data, identifying at least one static object from the 2D image data, obtaining 3D point cloud data of the static object from the 3D image data based on each one of the at least one static object, and calculating a vehicle relative coordinate of the vehicle based on the 3D point cloud data of the static object.

14 Claims, 6 Drawing Sheets

(51) Int. Cl.
  *H04N 13/156* (2018.01)
  *H04N 13/293* (2018.01)
  *G01S 17/89* (2020.01)
  *G01S 17/42* (2006.01)

(52) U.S. Cl.
  CPC ......... *H04N 13/156* (2018.05); *H04N 13/293* (2018.05); *G06T 2207/10028* (2013.01); *G06T 2207/30252* (2013.01)

(56) References Cited

U.S. PATENT DOCUMENTS

| | | | |
|---|---|---|---|
| 10,121,082 | B2 | 11/2018 | Heisele et al. |
| 2016/0047888 | A1 | 2/2016 | Roberts |
| 2017/0076455 | A1 | 3/2017 | Newman et al. |
| 2018/0157269 | A1 | 6/2018 | Prasad et al. |
| 2018/0157920 | A1 | 6/2018 | Hu |
| 2018/0203113 | A1 | 7/2018 | Taylor et al. |
| 2019/0311546 | A1* | 10/2019 | Tay ........................ G01S 17/931 |
| 2019/0340775 | A1* | 11/2019 | Lee ........................ G01S 17/931 |
| 2019/0353784 | A1* | 11/2019 | Toledano ................ G01S 17/48 |
| 2019/0384310 | A1* | 12/2019 | Merfels ................. G01S 13/931 |

FOREIGN PATENT DOCUMENTS

| | | |
|---|---|---|
| CN | 108345836 | 7/2018 |
| CN | 108622093 | 10/2018 |
| CN | 108830159 | 11/2018 |
| JP | 2017-102838 | 6/2017 |
| JP | 2017-194487 | 10/2017 |
| JP | 6368959 | 8/2018 |
| JP | 2018-180181 | 11/2018 |
| TW | 201110928 | 4/2011 |
| TW | I403690 | 8/2013 |
| TW | I431250 | 3/2014 |
| TW | 201528220 | 7/2015 |
| TW | I535589 | 6/2016 |
| WO | 2017/159382 | 9/2017 |

OTHER PUBLICATIONS

Song, et al. "A Novel Method of Spatial Calibration for Camera and 2D Radar Based on Registration", 2017 6th IIAI International Congress on Advanced Applied Informatics(IIAI-AAI); 20171611; 1055-1056.
Christie, et al. "3D reconstruction of dynamic vehicles using sparse 3D-laser-scanner and 2D image fusion", 2016 International Conference on Informatics and Computing(ICIC); Apr. 24, 2017; 61-65.
Deilamsalehy, et al. "Sensor fused three-dimensional localization using IMU, camera and LiDAR", 2016 IEEE Sensors; Jan. 9, 2017; 1-3.
Xu, et al. "3D point cloud map based vehicle localization using stereo camera", 2017 IEEE Intelligent Vehicles Symposium(IV); Jul. 31, 2017; 487-492.
Wolcott, et al. "Visual localization within LIDAR maps for automated urban driving", 2014 IEEE/RSJ International Conference on Intelligent Robots and Systems; Nov. 6, 2014; 176-183.
Japanese Office Action for Japanese Patent Application No. 2019-136998 dated Oct. 5, 2020.
Taiwanese Office Action for Taiwanese Patent Application No. 108112604 dated Feb. 2, 2021.

* cited by examiner

VEHICLE, VEHICLE POSITIONING SYSTEM, AND VEHICLE POSITIONING METHOD

CROSS-REFERENCE TO RELATED APPLICATIONS

This application claims the benefit of U.S. provisional application Ser. No. 62/773,124, filed on Nov. 29, 2018, and claims priority to Taiwanese application Ser. No. 108112604, filed on Apr. 22, 2019. The entirety of the patent applications is hereby incorporated by reference herein and made a part of this specification.

BACKGROUND

1. Technical Field

This disclosure relates to a vehicle, a vehicle positioning system and a vehicle positioning method.

2. Description of Related Art

Autopilot technology is expected to improve driving safety and driving convenience to reduce driving burden. With regard to autonomous driving, environmental awareness is a necessary function to avoid collisions. In addition, accurate positioning is also very important, especially in urban environments, where a variety of complex objects can likely affect the positioning of the car. A vehicle positioning method generally uses active sensors or passive sensors. Passive sensors include cameras, a global positioning system (GPS), etc., and the active sensors include a LiDAR sensor. Although the camera uses an image object detection module to identify objects in the image frame, the object may not be correctly positioned in the three-dimensional space, and thus the position of the vehicle cannot be correctly determined, resulting in a positioning error. In a general GPS positioning method, if a vehicle is running in a tunnel or an indoor area, the sensor cannot receive signals due to a shielding effect, and the vehicle cannot be positioned accurately. The LiDAR sensor can detect the object and locate the object in a 3D space, but still cannot identify the type of the object.

Current self-driving vehicles need to use pre-established map information when running, and the map information needs to include various road information, such as road boundaries, traffic lights, speed limit signs, and the like. In this way, the self-driving algorithm can make the self-driving car run correctly according to the specified route and traffic rules. A method of establishing map data is to equip LiDAR and GPS on the vehicle, and after the vehicle is running on the road, stacking/integrating the LiDAR point cloud data (i.e., the LiDAR point cloud map) and the GPS coordinate data (i.e., the GPS coordinate map) offline. However, the positioning accuracy of a self-driving car needs to be less than 10 cm. When the self-driving car is running, the large amount of instant point cloud data obtained by the LiDAR sensor is compared with the built-in LiDAR point cloud map to obtain positioning data. However, a large amount of point cloud data is likely to cause comparison error and increase the amount of calculation because the large amount of point cloud data contain redundant information, such as running vehicles, pedestrians, or vehicles parked on the roadside.

Therefore, how to improve of the conventional positioning technique, including the positioning error of the image objects detected by a camera and the great amount of operation of point cloud data of the LiDAR sensor, is becoming an issue in the art.

SUMMARY

In view of the problems of the prior art, this disclosure provides a vehicle, a vehicle positioning system and a vehicle positioning method.

In an embodiment, the vehicle positioning system comprises: a 2D image sensor configured for obtaining 2D image data; a 3D sensor configured for obtaining 3D point cloud data; and a processor coupled to the 2D image sensor and the 3D sensor and at least configured to be applied to: an aligning module configured for merging the 2D image data and the 3D point cloud data to generate 3D image data; a static object identifying module configured for identifying at least one static object from the 2D image data to obtain 3D point cloud data of the static object from the 3D image data based on each one of the at least one static object; and a positioning module configured for calculating a vehicle relative coordinate of a vehicle based on the 3D point cloud data of the static object.

In an embodiment, the vehicle positioning method is applicable to a vehicle positioning system, and comprises: obtaining 2D image data; obtaining 3D point cloud data; merging the 2D image data and the 3D point cloud data to generate 3D image data; identifying at least one static object from the 2D image data; obtaining 3D point cloud data of the static object from the 3D image data based on the static object; and calculating a vehicle relative coordinate of a vehicle based on the 3D point cloud data of the static object.

In an embodiment, the vehicle is equipped with a vehicle positioning system, and comprises: a 2D image sensor configured for obtaining 2D image data; a 3D sensor configured for obtaining 3D point cloud data; and a processor coupled to the 2D image sensor and the 3D sensor, and configured to be applied to: an aligning module configured for merging the 2D image data and the 3D point cloud data to generate 3D image data; a static object identifying module configured for identifying at least one static object from the 2D image data to obtain 3D point cloud data of the static object from the 3D image data based on each one of the at least one static object; and a positioning module configured for calculating a vehicle relative coordinate of the vehicle based on the 3D point cloud data of the static object.

In the vehicle, the vehicle positioning system and the vehicle positioning method according to this disclosure, the vehicle is combined with the 2D image sensor and the 3D sensor, which are two different kinds of sensors, to obtain the 3D image data after identifying the static object from the 2D image data, to obtain the 3D point cloud data of each static object from the 3D image data, and to calculate the vehicle relative coordinate of the vehicle and the static object, so that the vehicle is positioned.

BRIEF DESCRIPTION OF DRAWINGS

The disclosure can be more fully understood by reading the following detailed description of the embodiments, with reference made to the accompanying drawings, wherein.

DETAILED DESCRIPTION

Figure 1:
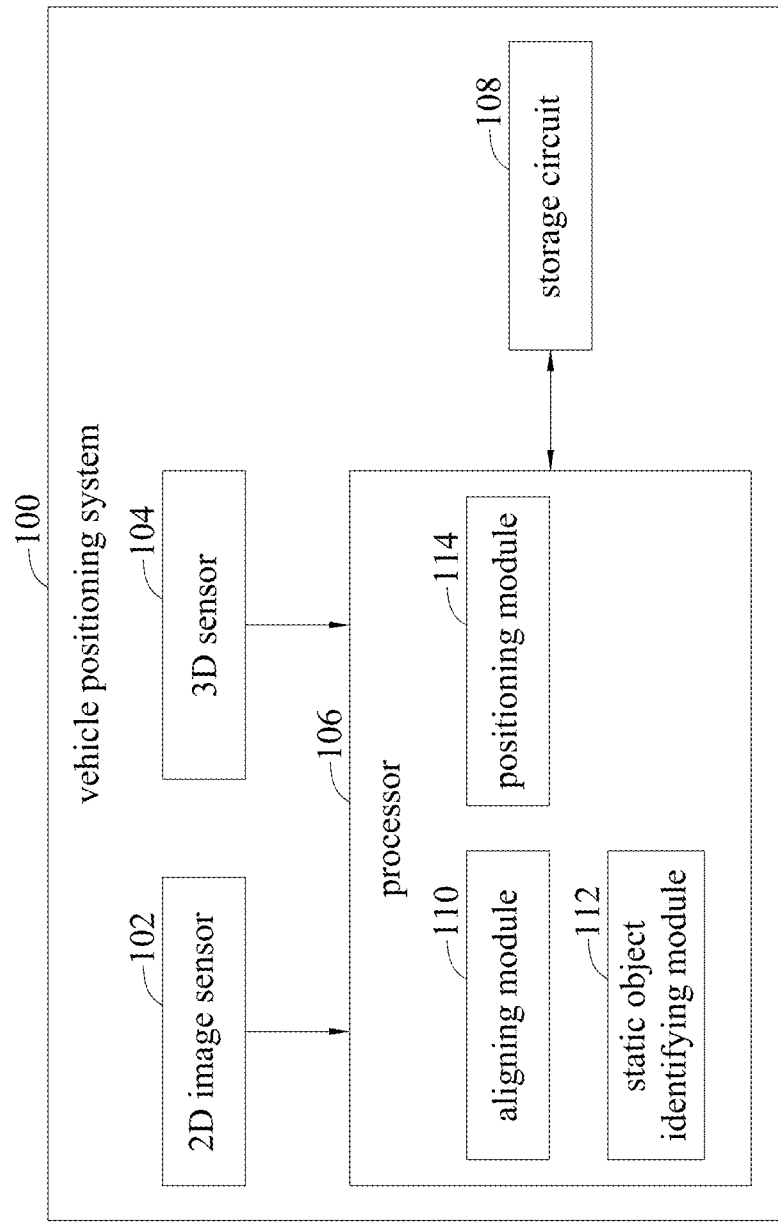
FIG. 1 is a schematic diagram of a vehicle positioning system of an embodiment according to this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a vehicle positioning system 100 of an embodiment according to this disclosure. The vehicle positioning system 100 is equipped on, but not limited to a vehicle. The vehicle positioning system 100 and a vehicle positioning method according to this disclosure can be performed in a substitute environment to detect objects in a traffic flow and a view of field. In an embodiment, one or more functions described in the specification can be performed by, but not limited to, an electronic device, a mobile device, a game console, a car system console (e.g., ADAS), a wearable device (e.g., a personal wearable camera), a head mount display, a robot, a robotic device, an unmanned aerial vehicle (UAV) or a remotely controlled aircraft. In an embodiment, the vehicle, on which the vehicle positioning system 100 is equipped, includes a motor vehicle (e.g., a car, a truck, a motorcycle, a bus and a train), a vessel (e.g., a ship and a boar), an aircraft (e.g., an airplane and a helicopter), a space ship (e.g., a space shuttle), a bicycle, or another delivery means. In an embodiment, the vehicle is a wheel vehicle, a caterpillar, a rail vehicle, an airborne vehicle or a sliding vehicle. In an embodiment, the vehicle is drove by one or more drivers. In an embodiment, the vehicle is configured to provide a driver of the vehicle with an adaptive driver assistance system (ADAS). In another embodiment, the vehicle is controlled by a computer. In an embodiment, the vehicle positioning system 100 can also be performed in a "cloud" or outside the vehicle. In an embodiment, the vehicle or other electronic devices provide position data and/or image data to another device for positioning the vehicle.

The vehicle positioning system 100 comprises one or more 2D image sensors 102, one or more 3D sensors 104, a processor 106 and a storage circuit 108. In an embodiment, the vehicle positioning system 100 of FIG. 1 is not limited to be equipped on a vehicle, and the storage circuit 108 is not limited to be included in the vehicle positioning system 100.

The 2D image sensor 102 is an image capturing device, an image pickup device, or a camera, such as a charge coupled device (CCD) camera and/or a complementary metal oxide semiconductor (CMOS) camera, that can capture images. The 2D image sensor 102 can be disposed on a variety of positions of the vehicle, and can capture images at different angles and views of field. In an embodiment, a front image pickup device, a lateral image pickup device and a rear image pickup device can be disposed on the vehicle on demands.

The 2D image sensor 102 obtains 2D image data. The 2D image sensor 102 may provide the 2D image data to the processor 106. The 2D image sensor 102 may capture images (e.g., 2D image data) constantly, periodically or occasionally, and load the images into the storage circuit 108.

The 3D sensor 104, such as a LiDAR sensor, detects a distance between the vehicle and an external object. The 3D sensor 104 may obtain optical signals relating to a reflected object within a scanning range to obtain 3D point cloud data. The 3D sensor 104 may capture 3D point cloud data constantly, periodically or occasionally, and load the 3D point cloud data into the storage circuit 108. The 3D sensor 104 may provide the 3D point cloud data to the processor 106. Each of the 3D point cloud data may comprise distance information relating to the vehicle and the reflected object. Each of the 3D point cloud data comprises location (X, Y, Z) data in a space. The 3D sensor 104, such as a LiDAR sensor, is not likely to be affected by sunlight and can measure distance information between the vehicle and the reflected object/object.

The processor 106 is coupled to the 2D image sensor 102 and the 3D sensor 104, and receives the 2D image data and the 3D point cloud data. In an embodiment, the processor 106 may capture the 2D image data and the 3D point cloud data from the storage circuit 108. In an embodiment, the storage circuit 108 or a part thereof may be configured to store the 2D image data received from the 2D image sensor 102 and the 3D point cloud data from the 3D sensor 104, to act as an cyclic buffer of the 2D image sensor 102 and the 3D sensor 104 that receives data.

In an embodiment, the processor 106 may comprise an aligning module 110, a static object identifying module 112 and a positioning module 114. The aligning module 110, the static object identifying module 112 and the positioning module 114 may be hardware components corresponding to the vehicle, software (e.g., instructions) executed by the processor 106, or a combination thereof.

The vehicle positioning system 100 may store predefined map information in the storage circuit 108 in advance. The predefined map information includes road information, such as start and end coordinates of a road segment, the width of a road lane, the number of road lanes, a navigation angle of a road, the curvature of a road, and the length of a road. The predefined map information comprises 3D point cloud data obtained via the 3D sensor 104, such as a LiDAR sensor, and GPS absolute coordinate data obtained via GPS. The predefined map information may be amended via real-time kinematic (RTK) of National Land Surveying and Mapping Center, and be mapped, after a coordinate transforming process is performed, onto an absolute coordinate system.

In an embodiment, the storage circuit 108 is a memory, a hard drive or any other elements that are used for storing data, and can be used for recording or storing modules, each of which is composed by one or more program code segments. The processor 106 is coupled to the storage circuit 108, and can perform the steps of a vehicle positioning method according to this disclosure by accessing the modules in the storage circuit 108. In another embodiment, the processor 106 may be a general processor, a specific processor, a conventional processor, a digital signal processor, microprocessors, one or more microcontrollers combined with a digital signal processor core, a controller, a microcontroller, an application specific integrated circuit (ASIC), a field programmable gate array (FPGA), or any types of integrated circuits, state machines, processor based on advanced RISC machine (ARM) or the like.

The aligning module 110 merges the 2D image data obtained by the 2D image sensor 102 and the 3D point cloud data obtained by the 3D sensor 104 by executing an alignment algorithm to obtain the 3D image data. The 3D image data include color data (e.g., RGB data) and depth data (e.g., location (X, Y, Z) data) of each image pixel. In other words, the 3D image data include RGBXYZ image data. In an embodiment, an alignment algorithm merging or fusing the 2D image data and 3D point cloud data is described. It is assumed that the 3D point cloud data are represented by (x, y, z), the pixel point of the 2D image data is (u, v), and the 3D point cloud data (x, y, z) are mapped to the pixel point (u, v) of the 2D image data according to an alignment algorithm as follows:

$$\begin{bmatrix} u \\ v \\ 1 \end{bmatrix} = \begin{bmatrix} f_u & 0 & u_0 \\ 0 & f_v & v_0 \\ 0 & 0 & 1 \end{bmatrix} \begin{bmatrix} R & T \\ 0 & 1 \end{bmatrix} \begin{bmatrix} x \\ y \\ z \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} x \\ y \\ z \\ 1 \end{bmatrix},$$

$$u = \frac{m_{11}x + m_{12}y + m_{13}z + m_{14}}{m_{31}x + m_{32}y + m_{33}z + m_{34}}, v = \frac{m_{21}x + m_{22}y + m_{23}z + m_{24}}{m_{31}x + m_{32}y + m_{33}z + m_{34}}, \text{ and}$$

$$M = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix},$$

where $f_u$ and $f_v$ are focal distances in horizontal and vertical directions, respectively, $u_0$ and $v_0$ are a center point of an image plane, a transformation matrix being obtained to map the 3D point cloud data (x, y, z) to the pixel point (u, v) of the 2D image data, and R and T are a rotation matrix and a translation vector, respectively.

Figure 2:
FIG. 2 is a schematic diagram illustrating aligning 2D image data and 3D point cloud data of an embodiment according to this disclosure.

FIG. 2 is a schematic diagram illustrating aligning the 2D image data and the 3D point cloud data according to this disclosure. Refer to FIGS. 1 and 2. The alignment algorithm merges the 2D image data (a background image of FIG. 2) obtained by the 2D image sensor 102 and the 3D point cloud data (a dotted image of FIG. 2) obtained by the 3D sensor 104 to generate the 3D image data, as shown in FIG. 2.

Figure 3:
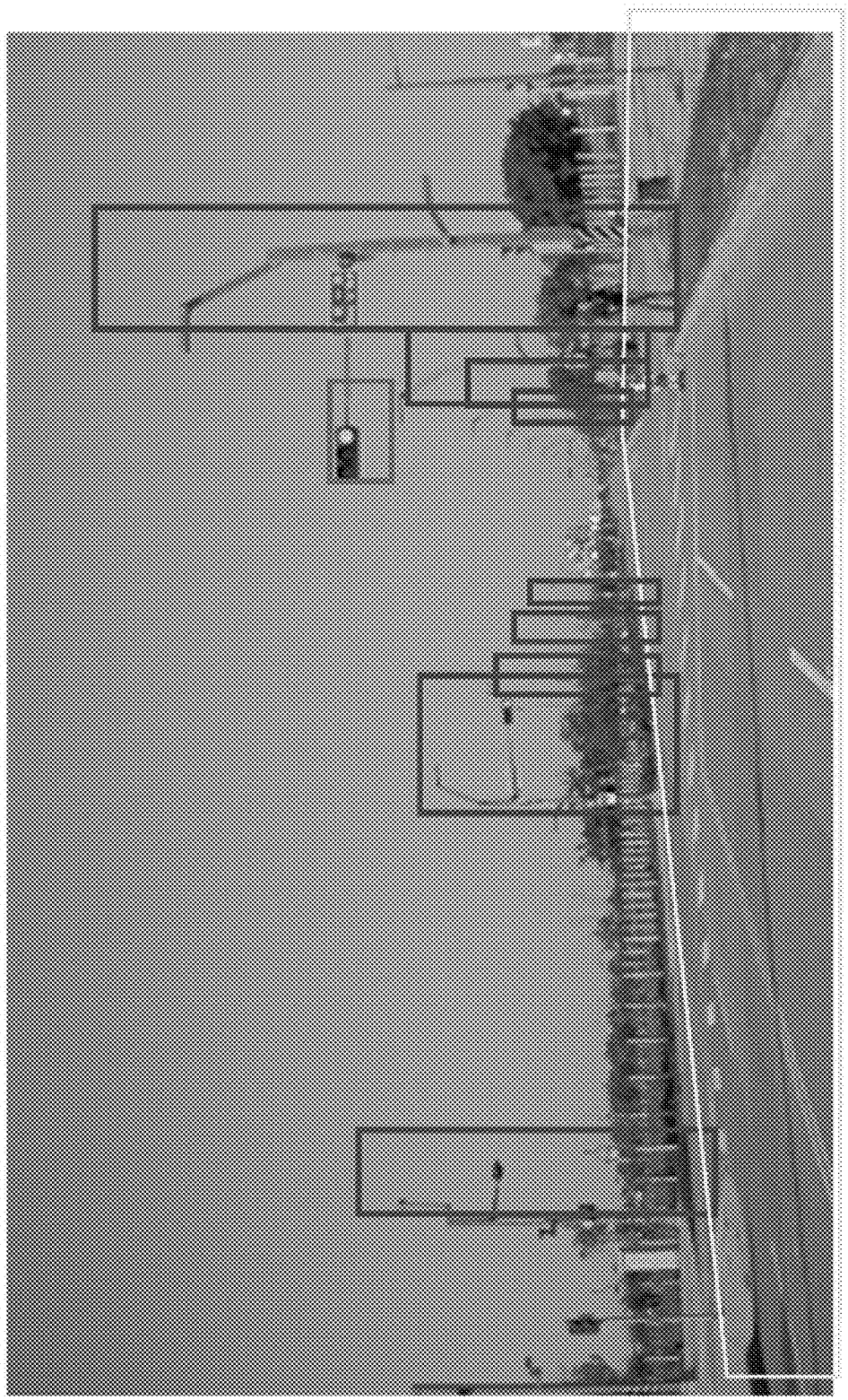
FIG. 3 is a schematic diagram illustrating identifying a static object from 2D image data of an embodiment according to this disclosure.

The 2D image data is obtained by the 2D image sensor 102. The static object identifying module 112 may determine at least one static object of the 2D image data. In an embodiment, the static object identifying module 112 includes a deep learning module dedicated to detect a static object and identify the type of the static object, such as road signs, buildings, transformer boxes, roads, sidewalks, bridges, trees, wire poles, Jersey barriers, etc. The deep learning module or the deep neural network of the static object identifying module 112 identifies a static object in an image via an image identifying algorithm. In an embodiment, an object identifying algorithm is an object contour tracking algorithm. A search window of the static object identifying module 112 detecting a static object may correspond to a model, a border box or a bounding box (BB) of an object. FIG. 3 is a schematic diagram illustrating identifying a static object from 2D image data of an embodiment according to this disclosure. A static object identifying algorithm is executed by identify each static object in the 2D image data, which is indicated by a bounding box. The bounding box as showed in FIG. 3 includes information of the static object, such as the type, the length and the width of the indicated object, and the position of the indicated object in the 2D image data.

Figure 4:
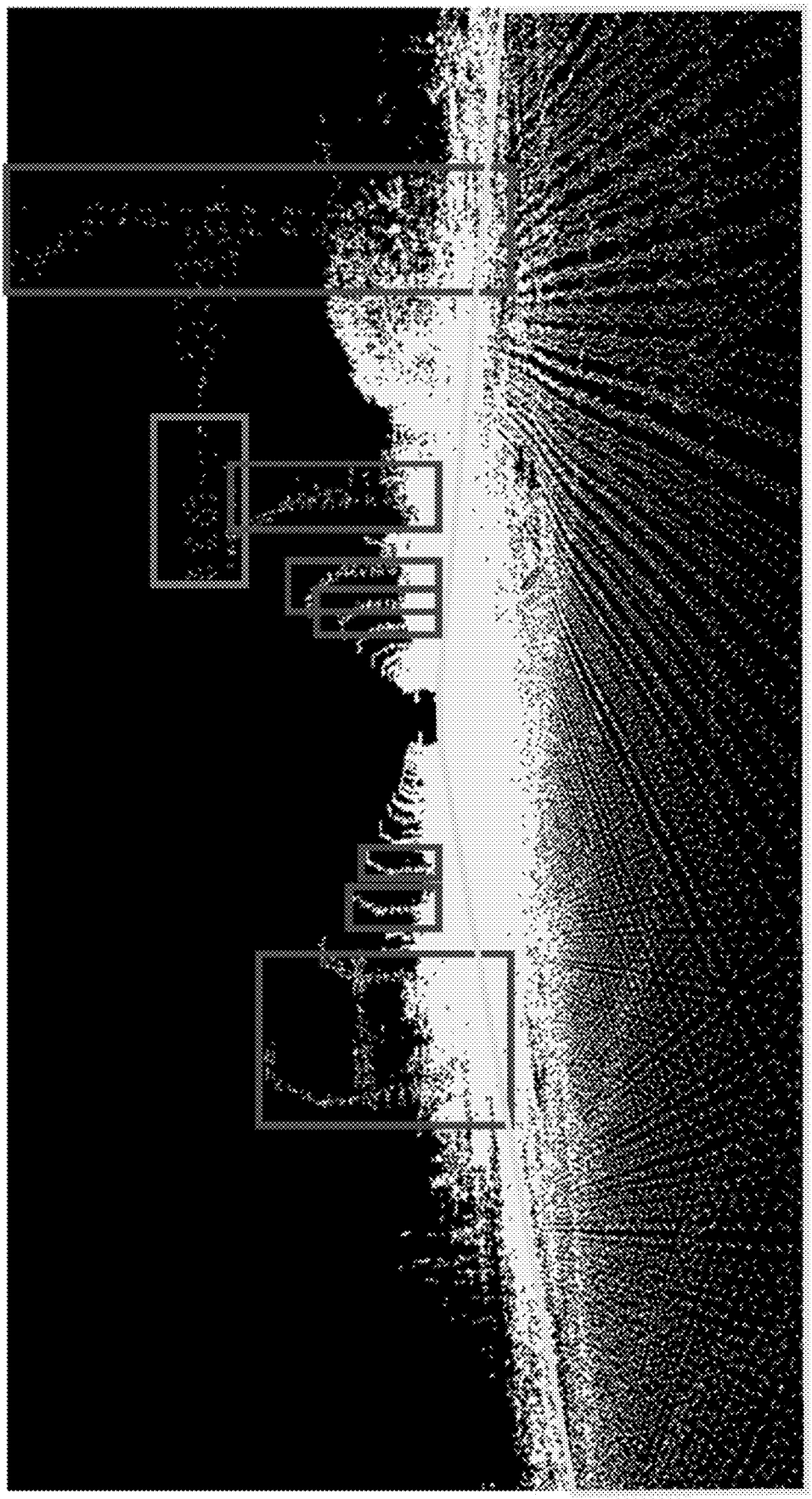
FIG. 4 is a schematic diagram illustrating, after each static object is identified, obtaining 3D point cloud data of each static object from the 3D image data of another embodiment according to this disclosure, based on the embodiment of FIG. 3.

When each static object in the 2D image data is obtained, the 3D point cloud data (X, Y, Z data) of each static object can be obtained from the 3D image data based on the information (e.g., type, length, width, and position) of the each static object. Each static object corresponds to the size of the static object in the 3D image data. Therefore, each static object may comprise multiple 3D point cloud data (depth information). FIG. 4 is a schematic diagram illustrating obtaining the 3D point cloud data of each static object from the 3D image data after each static object is identified of an embodiment according to this disclosure, based on FIG. 3. Please refer to FIGS. 3 and 4. Based on the information of each static object (including traffic signs, street lights, and roads) indicated by a bounding box of FIG. 3, the 3D point cloud data of each static object in the 3D image data can be obtained correspondingly.

When the vehicle positioning system 100 on the vehicle obtains the 3D point cloud data of each static object, the positioning module 114 of the vehicle positioning system 100 can then calculate a mean squared distances (MSD) of the vehicle point cloud data and the 3D point cloud data of the at least one static object based on the 3D point cloud data of the static object via a positioning algorithm, such as a three-point positioning algorithm, or by iteratively comparing the current 3D point cloud data with map point cloud data, to calculate and obtain a vehicle relative coordinate of the vehicle and the static object. In an embodiment, the vehicle relative coordinate can be mapped to predefined map information stored in advance. Since the predefined map information comprises 3D point cloud information and GPS absolute coordinate information, a 3D vehicle absolute coordinate of the vehicle can be obtained through the coordination definition and transformation of the vehicle relative coordinate and the predefined map information.

In another embodiment, the 3D point cloud data of each static object can be mapped to predefined map information stored in advance. Since the predefined map information includes 3D point cloud data and GPS absolute coordinate information, a 3D object absolute coordinate of the static object can be obtained by comparing the 3D point cloud data of the static object with a static 3D object of the predefined map information, to obtain the 3D vehicle absolute coordinate of the vehicle.

In an embodiment, the 2D image data obtained by the 2D image sensor 102 can obtain the contour, boundary and texture of an object based on the reflection characteristics of an object surface and the information of real world projected on an image plane, when an identifying algorithm based on 2D information identifies a real 3D object, the object cannot be positioned at a correct position in a 3D space. Therefore, the vehicle cannot be positioned correctly. The 3D sensor 104, though obtaining the 3D point cloud data of an object, cannot identify the type of the object. The vehicle can be positioned in real time by combining the characteristics and advantages of the 2D image sensor 102 and the 3D sensor 104, which are two different types of sensors, and detecting the 3D point cloud data of the static object.

According to this disclosure, the static object identifying module 112 identifies a static object, without identifying a dynamic object, because the static object is easier to be identified, as compared with the dynamic object. The shape and color of a static object changes less than those of a dynamic object, and the static object identifying module 112 can still obtain well enough static object identifying rate even with less training data and less model complexity.

The 2D image data of the 2D image sensor 102 are merged with the 3D point cloud data of the 3D sensor 104, and the static object identifying module 112 identifies each static object to obtain the 3D point cloud data of each static object, and obtains the vehicle relative coordinate of the vehicle and the static object, so that the vehicle is positioned.

Figure 5:
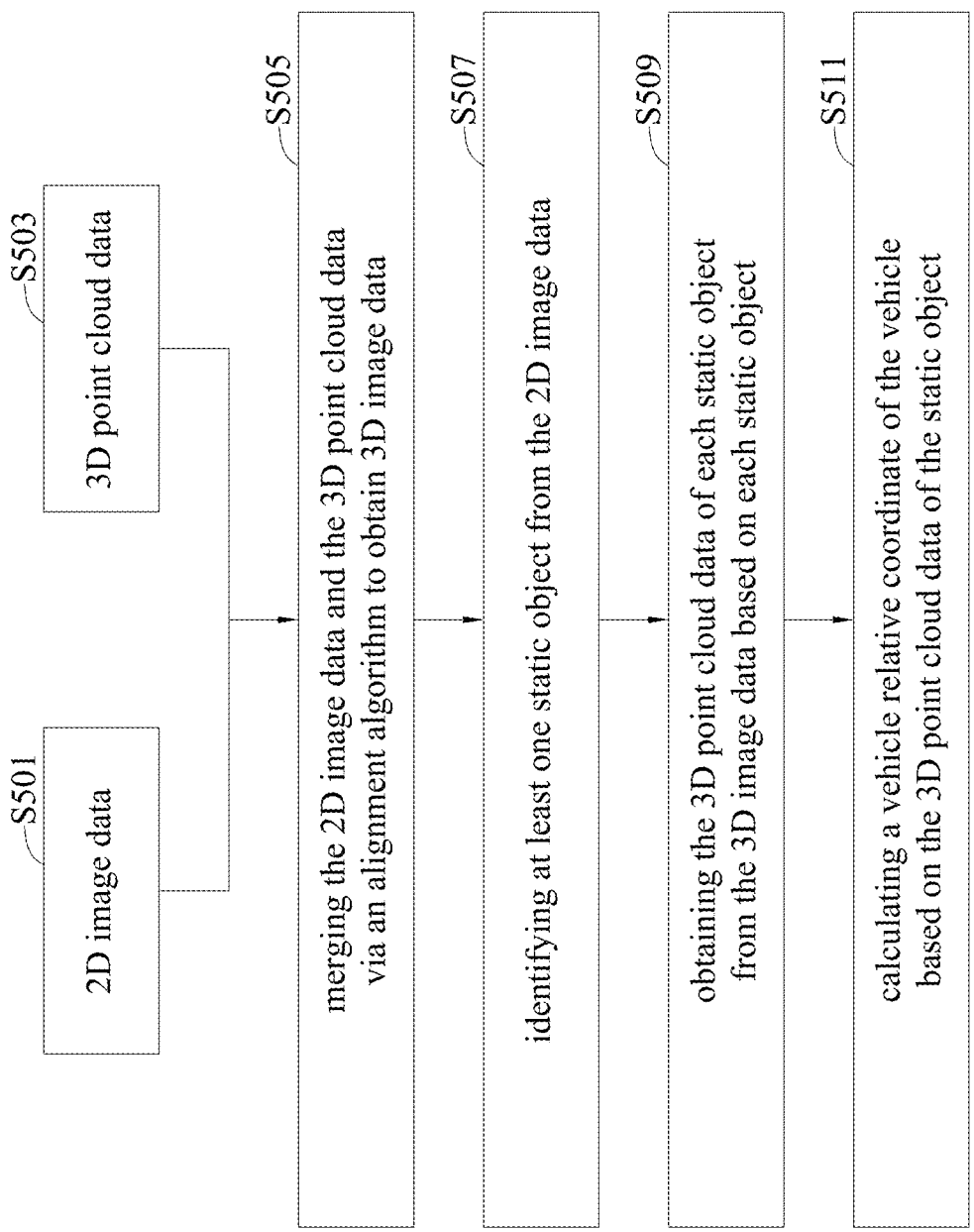
FIG. 5 is a schematic diagram illustrating a flow chart of the operation of a vehicle positioning system of an embodiment according to this disclosure.

FIG. 5 is a schematic diagram illustrating a flow chart of the operation of a vehicle positioning system of an embodiment according to this disclosure.

In step S501, the 2D image sensor 102 obtains the 2D image data, which include the scene of at least one static object. In step S503, the 3D sensor 104 obtains the 3D point cloud data. In step S505, the aligning module 110 merges or fuses the 2D image data and the 3D point cloud data via an alignment algorithm to obtain the 3D image data. In step S507, the static object identifying module 112 identifies at least one static object from the 2D image data. In step S509, the 3D point cloud data of each static object are obtained from the 3D image data based on each static object. In step S511, the positioning module 114 calculates the vehicle relative coordinate of the vehicle based on the 3D point cloud data of the static object. The 3D vehicle relative coordinate of the 3D image data of the vehicle is calculated based on the 3D point cloud data of the static object via a positioning algorithm.

Figure 6:
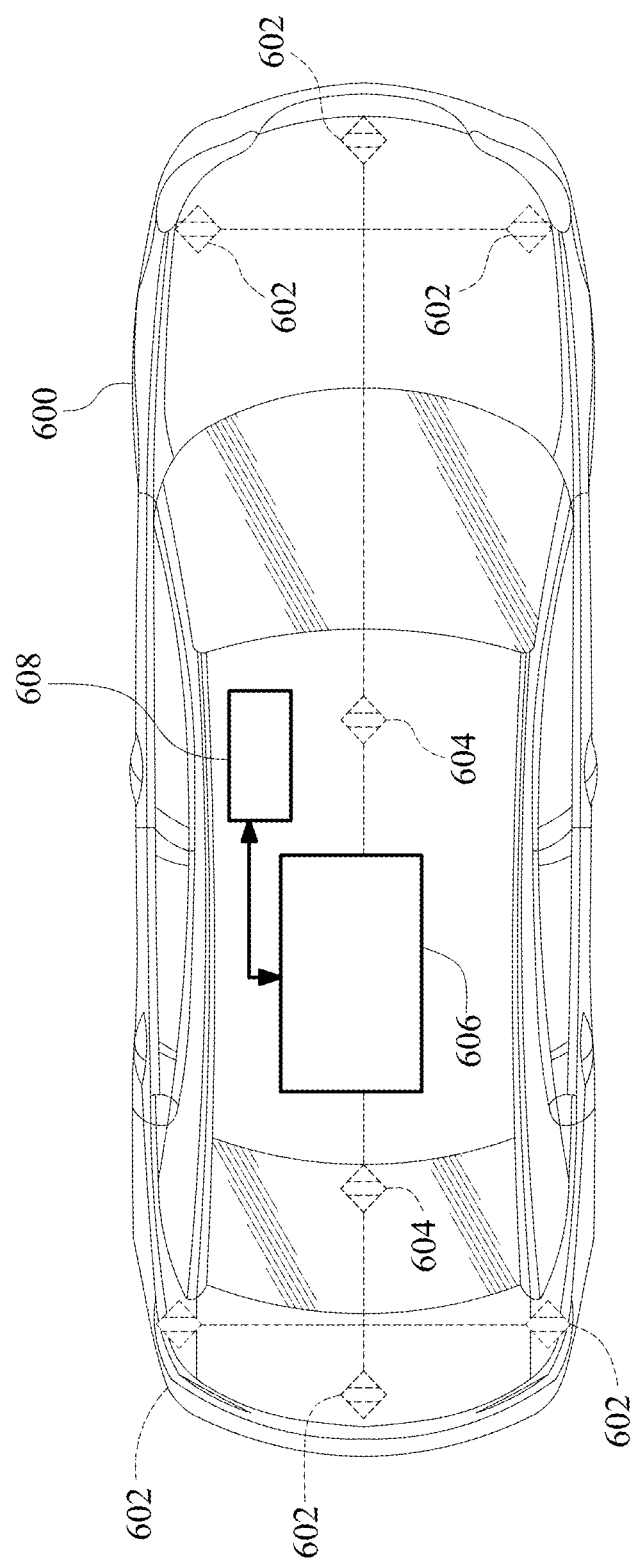
FIG. 6 is a schematic diagram illustrating a vehicle being in direct or indirect communication with a vehicle positioning system of an embodiment according to this disclosure.

FIG. 6 is a schematic diagram illustrating a vehicle 600 being in direct or indirect communication with a vehicle positioning system of an embodiment according to this disclosure. The vehicle positioning system of FIG. 6 comprises a processor 606 and a storage 608 that can be disposed on the vehicle 600 or disposed at another place/position far from the vehicle 600. In an embodiment, the processor 606 and the storage 608 of the vehicle positioning system are disposed far from the vehicle 600, and the vehicle 600 can communicate with the processor 606 and the storage 608. In an embodiment, the vehicle 600 is, but not limited to, a car.

One or more 2D image sensors 602 and one or more 3D sensors 604 are disposed on the vehicle 600. In an embodiment, the vehicle positioning system can perform the functions and operations of FIGS. 1 to 4, including aligning the 2D image data obtained by the 2D image sensor 602 of the vehicle 600 with the 3D point cloud data captured by the 3D sensor 604 to obtain the 3D image data, obtaining the 3D point cloud data of each static object from the 3D image data based on each static object of the 2D image data, and calculating the vehicle relative coordinate of the vehicle via the 3D point cloud data of the static object, so that the vehicle is positioned.

In the vehicle, the vehicle positioning system and the vehicle positioning method according to this disclosure, the vehicle is combined with the 2D image sensor and the 3D sensor, which are two different types of sensors, to obtain the 3D image data, obtains the 3D point cloud data of each static object from the 3D image data after identifying the static object of the 2D image data, calculates and obtains the vehicle relative coordinate of the vehicle and the static object, and maps to the predefined map information to obtain the vehicle relative coordinate, so that the vehicle is positioned. Therefore, the vehicle can use a deep learning model dedicated to detect a static object to reduce the image identifying time of the static object. According to this disclosure, only the 3D point cloud data of the static object are needed, the amount of operation of the 3D point cloud data is reduced, and the vehicle can be positioned accurately.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle positioning system, comprising:
   a 2D image camera configured for capturing images at different angles and views of field to obtain 2D image data;
   a LiDAR sensor configured for receiving optical signals relating to a reflected object within a scanning range to obtain 3D point cloud data; and
   a processor coupled to the 2D image camera and the LiDAR sensor and configured for:
      mapping a pixel point of the 2D image data to the 3D point cloud data by using transformation matrix to merge the 2D image data and the 3D point cloud data according to an alignment algorithm to generate 3D image data;
      identifying at least one static object from the 2D image data to obtain 3D point cloud data of the static object from the 3D image data that is generated by merging the 2D image data and the 3D point cloud data based on each one of the at least one static object; and
      calculating a vehicle relative coordinate of a vehicle based on the 3D point cloud data of the static object by iteratively comparing the 3D point cloud data with map point cloud data and calculating a mean squared distance of a point cloud data of the vehicle and the 3D point cloud data of the static object via a positioning algorithm.

2. The vehicle positioning system of claim 1, wherein the vehicle relative coordinate maps to predefined map information stored in a storage circuit in advance to obtain 3D vehicle absolute coordinate of the vehicle.

3. The vehicle positioning system of claim 1, wherein the 3D point cloud data of the static object map to predefined map information stored in a storage circuit in advance to obtain 3D object absolute coordinate of the static object.

4. The vehicle positioning system of claim 3, wherein the processor calculates 3D vehicle absolute coordinate of the vehicle based on the 3D object absolute coordinate of the static object.

5. The vehicle positioning system of claim 1, wherein the 2D image camera is a charge coupled element camera or a complementary metal oxide semiconductor camera.

6. A vehicle positioning method applicable to a vehicle positioning system, the vehicle positioning method comprising:
   obtaining 2D image data;
   obtaining 3D point cloud data;
   mapping a pixel point of the 2D image data to the 3D point cloud data by using transformation matrix to merge the 2D image data and the 3D point cloud data according to an alignment algorithm to generate 3D image data;
   identifying at least one static object from the 2D image data;
   obtaining 3D point cloud data of the static object from the 3D image data that is generated by merging the 2D image data and the 3D point cloud data based on the static object; and
   calculating a vehicle relative coordinate of a vehicle based on the 3D point cloud data of the static object by iteratively comparing the 3D point cloud data with map point cloud data and calculating a mean squared distance of a point cloud data of the vehicle and the 3D point cloud data of the static object via a positioning algorithm.

7. The vehicle positioning method of claim 6, further comprising mapping the vehicle relative coordinate to predefined map information stored in advance to obtain 3D vehicle absolute coordinate of the vehicle.

8. The vehicle positioning method of claim 6, further comprising mapping the 3D point cloud data of the static object to predefined map information stored in advance to obtain 3D object absolute coordinate of the static object.

9. The vehicle positioning method of claim 8, further comprising calculating 3D vehicle absolute coordinate of the vehicle based on the 3D object absolute coordinate of the static object.

10. A vehicle equipped with a vehicle positioning system, the vehicle comprising:
- a 2D image camera configured for capturing images at different angles and views of field to obtain 2D image data;
- a LiDAR sensor configured for receiving optical signals relating to a reflected object within a scanning range to obtain 3D point cloud data; and
- a processor coupled to the 2D image camera and the LiDAR sensor and configured for:
  - mapping a pixel point of the 2D image data to the 3D point cloud data by using transformation matrix to merge the 2D image data and the 3D point cloud data according to an alignment algorithm to generate 3D image data;
  - identifying at least one static object from the 2D image data to obtain 3D point cloud data of the static object from the 3D image data that is generated by merging the 2D image data and the 3D point cloud data based on each one of the at least one static object; and
  - calculating a vehicle relative coordinate of the vehicle based on the 3D point cloud data of the static object by iteratively comparing the 3D point cloud data with map point cloud data and calculating a mean squared distance of a point cloud data of the vehicle and the 3D point cloud data of the static object via a positioning algorithm.

11. The vehicle of claim 10, wherein the vehicle relative coordinate maps to predefined map information stored in a storage circuit in advance to obtain 3D vehicle absolute coordinate of the vehicle.

12. The vehicle of claim 10, wherein the 3D point cloud data of the static object maps to predefined map information stored in a storage circuit in advance to obtain 3D object absolute coordinate of the static object.

13. The vehicle of claim 12, wherein the processor calculates 3D vehicle absolute coordinate of the vehicle based on the 3D object absolute coordinate of the static object.

14. The vehicle of claim 10, wherein the 2D image camera is a charge coupled element camera or a complementary metal oxide semiconductor camera.

* * * * *